INVENTOR
WALTER A. O. HERRMANN
BY
ATTORNEYS

United States Patent Office 2,740,707
Patented Apr. 3, 1956

2,740,707

METHOD OF EXTRACTING METAL VALUES FROM METAL BEARING MATERIAL

Walter Andrew Otto Herrmann, Ottawa, Ontario, Canada, assignor to Sherritt Gordon Mines Limited, Toronto, Ontario, Canada, a company of Ontario Application April 12, 1954, Serial No. 422,590

5 Claims. (Cl. 75—101)

This invention relates to a method of extracting metal values from metal bearing material.

Hydrometallurgical methods of extracting metal values from metal bearing material by a solvent or lixiviant are well known and are widely used. Heretofore, except in the practice of leaching metal bearing material by percolation, such methods usually have involved the dispersion in a mechanically agitated reaction vessel of a slurry of finely pulverized metal bearing material and a solvent or lixiviant for the metal values it is desired to extract. As a result of recent discoveries, the use of hydrometallurgical methods, or "wet" processes, is being extended to include the treatment of metal bearing materials formerly treated by pyrometallurgical methods. These recent discoveries involve leaching metal bearing materials at elevated temperature and pressure, and may involve the use of gases under pressure which take part in the reactions by means of which metal values are extracted from the starting material and are dissolved in the leach solution. It is essential that the leaching or lixiviation stage of such a hydrometallurgical process be conducted in as short a time as possible with a maximum extraction of the metal or metals of interest from the metal bearing material, with efficient absorption of the reacting gas, and with a minimum of capital and operating costs.

It has been found that conventional reaction vessels, such as autoclaves, which are adapted to be operated at temperatures and pressures above atmospheric temperature and pressure can be employed in the leaching stage but the results are not completely satisfactory. For example, factors which affect the rate and the efficiency of the extraction of metal values and their conversion to salts which are soluble in the leach solution are temperature, pressure, gas-liquid interface, absorption of gas by the solution and transfer of gas through the liquid film on the solid-liquid interface and the rate and efficiency of the adsorption by the surfaces of the metal values containing solids of reacting constituents of the gas. Thus, the rate and the efficiency of the extraction of metal values and their dissolution in the leach solution are largely dependent on the agitation of the slurry. There is no particular difficulty in obtaining by mechanical agitation in a relatively small vessel a relatively uniform dispersion of solids in a liquid and a satisfactory gas-liquid and solid-liquid interface. However, the effectiveness of mechanically agitated vessels decreases as the vessel size is increased due to increased difficulty of obtaining uniform active agitation throughout the body of the slurry, increased non-agitated areas, and progressively increasing difficulty in maintaining a favourable ratio between liquid volume and gas-liquid interface on which depends the rapid, efficient and economical extraction of metal values. Also, the slurry in the reaction vessel is often abrasive and may be highly corrosive at the temperature and pressure of operation and these characteristics of the slurry create important difficulties in operation, particularly in respect of agitators, agitator bearings, stuffing boxes, and mechanical seals.

I have found that difficulties encountered in conducting the leaching stage in a conventional, mechanically agitated pressure vessel can be overcome by conducting that stage in a vertically disposed reaction column in which a slurry comprised of finely divided metal bearing particles and leach liquor is agitated and the solid metal bearing particles of the charge are dispersed in the slurry by a gas injected under pressure into the base of the reaction column. Specifically, finely divided solid metal bearing particles and a leach liquor for selected metal values contained therein and a gas under pressure are continuously charged into the lower part of a vertically disposed tower or reaction column maintained at a temperature and pressure above atmospheric temperature and pressure. The tower is completely filled with a continuously rising turbulent suspension of gas bubbles, solid metal bearing particles and liquid solvent of substantially uniform cross section and of substantially uniform velocity without fall back of solid particles from the point of entry of the metal bearing particles to the point of discharge of the slurry. The distribution of the metal bearing particles in the column, the rate of discharge of solid particles and leach liquor and gas from the upper part of the reaction column and the extraction of metal values to obtain optimum extraction of metal values from the metal bearing material in their upward passage through the column are interregulated by the rate of feeding slurry and gas into the lower part of the reaction column. A mixture of undissolved solid particles and leach liquor containing dissolved solid particles and gas are continuously discharged from the upper part of the reaction column.

Agitation of the slurry is effected by feeding gas into the tower, and extraction of metal values is effected by reaction between the particles of metal bearing material, constituents of the gas and leach liquor. The rate of upward flow of the gas and pulp mixture through the vessel is regulated to obtain maximum gas-liquid interface and thorough agitation of the slurry whereby rapid, efficient and economical extraction of metal values from the metal bearing material is obtained. As metal values are extracted from the metal bearing material, the particles become lighter and are carried upwardly by the upwardly rising mixture of gas and slurry, while heavier, less leached particles tend to remain in the lower part of the tower, thus providing a hindered settling effect by means of which the extent to which metal values are extracted from the starting material can be easily regulated and closely controlled. The mixture of gas and slurry are continuously withdrawn from the upper part of the tower, gas is separated from the slurry and the slurry comprised of undissolved solids and solution containing dissolved metal values can be treated for the recovery of metal values.

An understanding of the method of the present invention and the manner in which it is operated can be had from the following detailed description, reference being made to the accompanying drawings, in which.

Like reference characters refer to like parts throughout the description and drawings.

The operation of the method of the present invention is described hereinafter as applied to the treatment of mineral sulphide concentrates which contain values of metals such as copper, nickel and cobalt. An oxygen bearing, oxidizing gas such as air, oxygen enriched air, or oxygen with or without an inert gas, is employed as the agitating medium and the oxygen content serves to supply at least part of the oxidizing agent. The leach liquor, is described as concentrated ammonia solution of the order of about 1 part 28% NH$_3$ to about 1.5 parts water. Sufficient water is added to the vessel to provide a slurry containing from about 15% to about 30% solids. It will be understood, of course, that the method can be employed in the treatment of other types of mineral ores and concentrates, secondary metals, metallurgical residues, and other metal bearing materials; the leach liquor can be any type of lixiviant, organic or inorganic, suitable as a solvent for the metal values of interest, and the gas can be of a type suitable for agitating the slurry and, if required, for taking part in the reaction by means of which metal values are extracted from the starting material.

Figure 1:
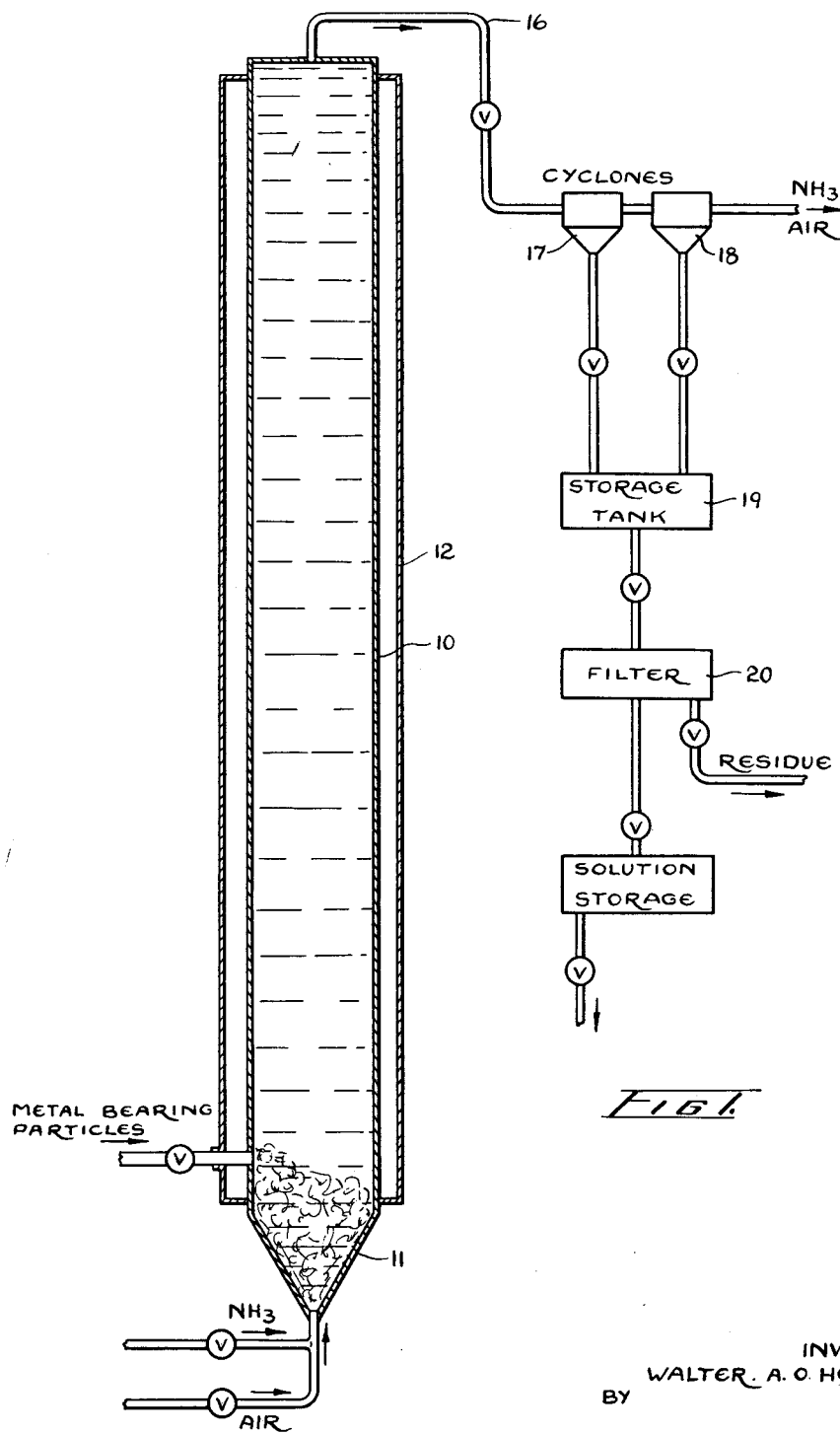
Figure 1 is an elevation of a tower reactor suitable for use in the operation of the method of the present invention with ancillary apparatus illustrated as a flow sheet.

Referring to the modification of the invention illustrated by Figure 1, the numeral 10 indicates an elongated, vertically disposed tower having an inverted, cone-shaped base 11. The tower is in the form of a reaction column formed of or lined with material adapted to resist the corrosive and abrasive effects of the gas and slurry to which it is exposed and is designed to withstand the loads to which it is subjected. For example, a tower formed of or lined with mild steel is satisfactory for the treatment at moderate temperatures and pressures of alkaline pulp mixtures in the presence of an oxygen bearing, oxidizing gas. Acid pulp slurries may require a tower formed of or lined with stainless steel, or with titanium, or other conventional or unconventional acid resisting material.

Gas is fed into the apex of the inverted cone-shaped base of the tower. The leach liquor can be fed into the tower with the gas, as illustrated, or at a higher level. Finely pulverized metal bearing material, preferably in the form of a slurry, also can be fed into the base of the tower or at a point above the base, as illustrated.

Gas is rapidly adsorbed on early contact with the metal bearings particles and then more slowly, regardless of the concentration of the reactive constituents, as leaching proceeds. Consequently, it is preferred to have the gas and slurry flow concurrently and bring the particles into contact with the gas in which the reactive constituents are in their maximum concentration, that is, in the lower part of the tower. Slurry can be fed into the upper part of an unobstructed tower, if desired, and gas fed into the lower part, and the gas and slurry flow in countercurrent through the tower. The best leaching results, however, appear to be obtained when the slurry and gas flow concurrently from the bottom to the top of the tower.

Particles of metal bearing material tend to settle into the inverted cone-shaped base 11 and serve to break the stream of gas into a mass of bubbles and disperse them more or less uniformly throughout the entire cross sectional area of the tower to the extent that the mixture in the tower is in effect a continuously rising turbulent suspension of gas bubbles, metal bearing particles and leach liquor of substantially uniform cross section and of substantially uniform velocity without fall back of solid particles from the point of entry of the metal bearing particles to the point of discharge of the slurry.

Figure 4:
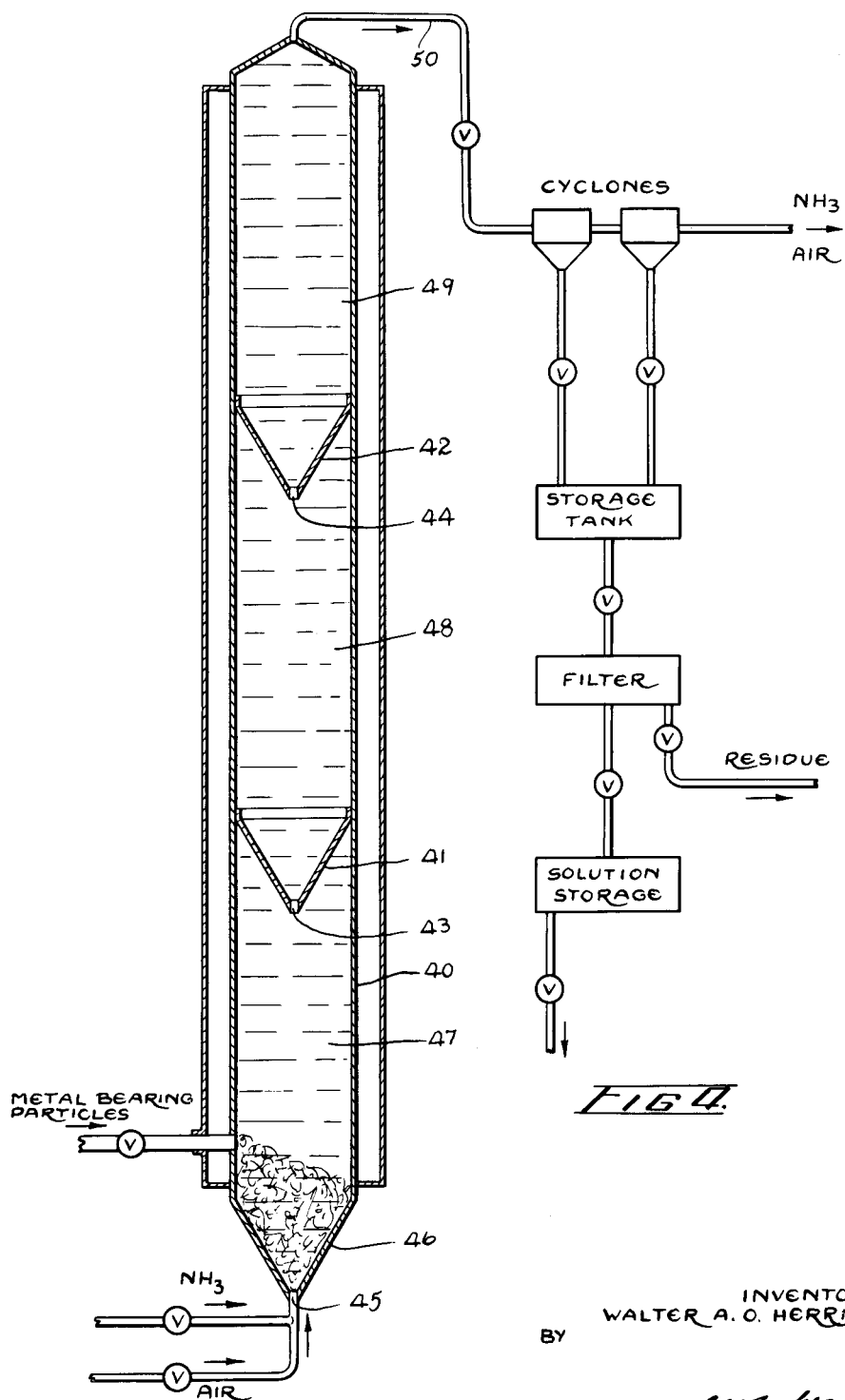
Figure 4 illustrates a further modification of the invention in which means are provided in the tower to retard recirculation of slurry.

If, in large towers, sufficient dispersion is not obtained by the metal bearing particles which settle into the cone-shaped base, dispersion means such as illustrated in Figure 4 and described in detail hereinafter, can be inserted in the cone. Also, if desired, additional air and/or leach liquor and/or metal bearing material can be added to the slurry above the lower part of the tower.

The mixture of gas bubbles and slurry rise upwardly through the reaction column or tower at a rate dependent upon the rate at which metal bearing material, gas and leach liquor are charged. As metal values are extracted from the particles of metal bearing material, the particles become lighter and rise in the column. Heavier particles rise more slowly and thus have a longer period of retention in the column for extraction of metal values. Non-ferrous metals such as zinc, copper, cobalt and nickel are rapidly extracted from the metal bearing material and dissolve in the leach solution. Iron values are converted to insoluble ferric hydrate and report in the undissolved residue.

Figure 2:
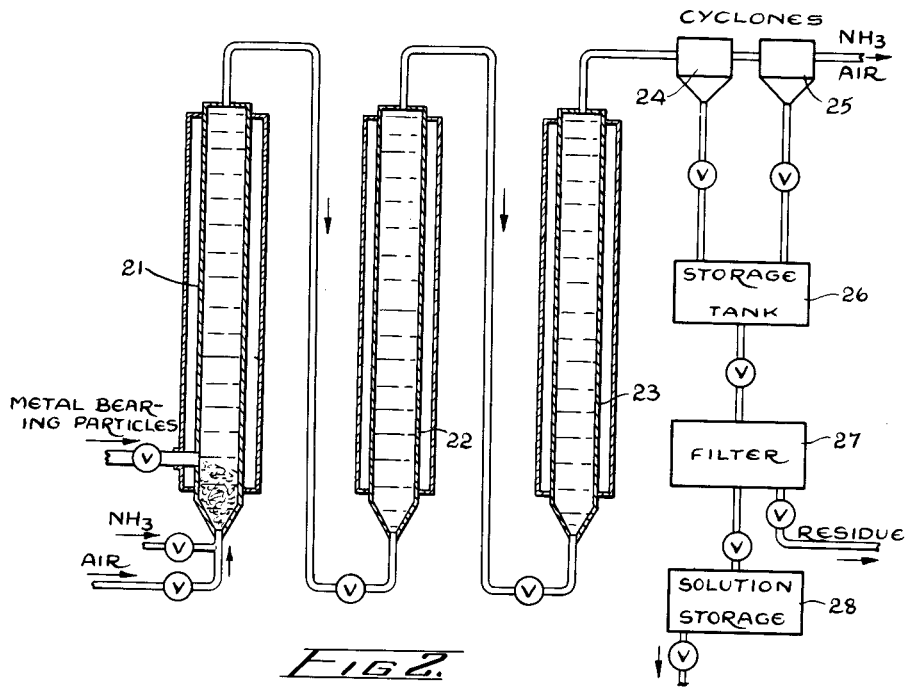
Figure 2 illustrates a modification of the invention in which a series of tower reactors are employed.
Figure 3:
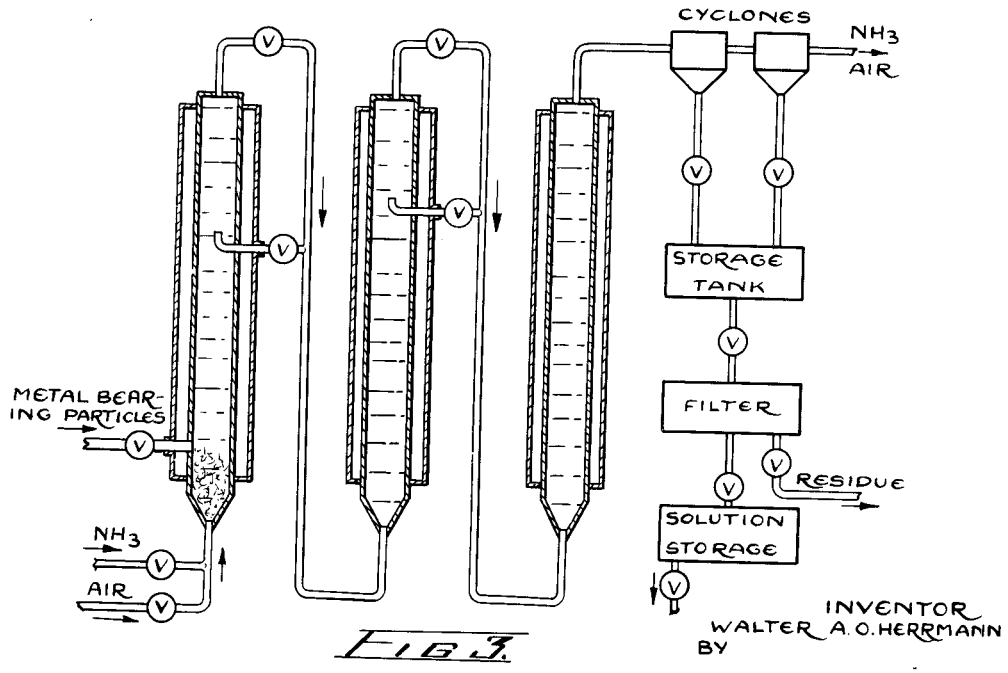
Figure 3 illustrates a further modification of the invention in which gas is withdrawn from the top of the tower and slurry is withdrawn at a point below the top.

A mixture of gas, leach liquor, and leached or partially leached metal bearing particles are withdrawn from the upper part of the tower, from the top as illustrated in Figures 1 and 2, or from a point below the top as illustrated in Figure 3. If the leaching stage is completed in a single tower, the mixture is treated for the separation of gas and the slurry is passed to ancillary apparatus for the separation of undissolved residue and recovery of metal values. If the leaching stage is not completed in a single tower, the mixture is passed to the base of a second tower and the operation is repeated in that tower or in sequence in a series of towers, as illustrated in Figure 2, until the metal values have been extracted to the desired extent.

The numeral 12 indicates cooling or heating coils or jackets as may be required to maintain the temperature of the slurry in the tower within the range within which the most satisfactory rate and efficiency of extraction are obtained. Extraction of metal values from mineral sulphides usually is an exothermic reaction, at least in the early stages of the reaction, and it may be necessary to cool at least the first tower as illustrated in Figure 1, or the first and second towers, as illustrated in Figures 2 and 3 to maintain the temperature within desired limits and, accordingly, the towers are cooled, such as by cooling coils. If a series of towers are employed, it may be necessary to cool the towers in which highly exothermic reactions take place and heat following towers in which less exothermic reactions take place. Extraction of metal values from oxidized ores and concentrates, metallurgical residues, secondary metals and the like are endothermic and it may be necessary to supply heat to the towers such as by heating coils.

The dimensions of the tower can be determined readily having regard to the nature and characteristics of the material from which metal values are to be extracted, the amount of metal bearing material to be treated within a prescribed period, the degree of agitation desired and maximum dispersion of gas bubbles throughout the mixture from the bottom of the tower to the top, and a minimum of recirculation from the top to the bottom. A cylindrical tower is, of course, preferred as providing most satisfactory operating results. The ratio of the height and diameter of the tower are functions of the specific properties of the material to be treated and the reaction to be performed and the reaction rate. As the diameter and the height of the tower are increased to treat larger volumes of feed material, greater gas pressures are required to hold the metal bearing material in suspension and to obtain the degree of agitation necessary to obtain maximum gas-liquid interface. Thus, difficulties may be encountered in maintaining a uniform dispersion of gas bubbles and metal bearing particles throughout the tower as the height and/or the diameter of the tower are increased. Having regard to these factors, it is found that very satisfactory results are obtained with towers having a ratio of diameter to height within the range of from about 1 to 200 to 1 to 10, with a maximum diameter of about 10 feet and a maximum height of about 100 feet.

A mixture of gas and slurry is withdrawn from the upper portion of the tower through conduit 16 and the mixture is passed to gas-liquid separating apparatus, such as cyclones 17—18. A mixture of air and ammonia is released and withdrawn from the cyclones and can be returned to the lower part of the tower 11 for re-use, or the ammonia can be scrubbed from the gas by known means and returned for re-use and air, depleted in oxygen and substantially free from ammonia, can be released to the atmosphere.

Slurry, substantially free from gas, can be passed to a tank 19 for storage, prior to treatment for the recovery of metal values, from which it can be withdrawn and undissolved solids separated from the solution such as by filtration in filter 20. The solution from the filter 20 is ready for treatment for the recovery of dissolved metal values. The filter cake, or residue, after washing with water to remove entrained solution can be discarded or it can be treated for recovery of undissolved residual metal values.

The modification of the invention illustrated in Figure 2 illustrates the operation of the leaching stage in a plurality of unobstructed towers. Leach liquor, gas and finely pulverized metal bearing particles are charged into the lower part of the first tower 21; a mixture of slurry and gas are withdrawn from the top of the first tower and passed to the base of a second tower 22; withdrawn from the top of the second tower and passed to the base of the third tower 23. The mixture of gas, leach liquor and leached solids are withdrawn from the top of the third tower, passed to the cyclones 24—25 and the resulting slurry is passed to storage tank 26 and thence through filter 27 and the filtrate to tank 28 in the manner described above. The leaching stage is illustrated as being conducted in three towers, but more or less towers can be employed according to the leaching characteristics of the material being treated. This modification has the further advantage that a plurality of relatively short towers can be employed instead of a single high tower.

The modification of the invention illustrated in Figure 3 is particularly adapted to the treatment of metal bearing material in which there is a selective flotation effect in the tower. Particles of metal bearing material which have selective floatable characteristics tend to be carried upwardly in the tower at a more rapid rate than other particles which rise normally in the tower as metal values are extracted. It is found, in the treatment of such materials that the slurry in the top of the tower may contain particles from which metal values have been extracted in different degrees, that is some particles have, in effect, by-passed the leaching step and still contain a relatively high percentage of extractable metal values and other particles which have been leached normally. It has been found that slurry withdrawn from the tower at a point below the level of this heterogeneous mixture contains solid particles which are of relatively uniform consistency in respect of non-extracted metal values. Thus, it is preferred to withdraw slurry from a point below the lower level of the by-passed particles and to regulate the rate of withdrawal so that a level is maintained above the point of withdrawal and only gas is withdrawn from the top of the tower. This method provides in the upper part of the tower sufficient time of retention to extract metal values from the by-passed particles to the same extent that they have been extracted from the normally leached particles. The gas withdrawn from the top of the tower can be added to the slurry withdrawn from a point lower in the tower and either passed to the slurry treatment stages described above or passed to the base of the next tower in the series, as illustrated in Figure 3, until metal values have been extracted from the metal bearing material to the desired extent and the mixture of gas and slurry is withdrawn from the upper part of the final tower and passed to the slurry treatment stages.

The modification of the invention illustrated in Figure 4 is particularly adapted for the operation of the method in high towers and in the treatment of metal bearing material which has selective flotation characteristics or in conducting a reaction in which it is desired to segregate products as the reaction proceeds.

The tower indicated by the numeral 40 is similar to the tower 10 illustrated in Figure 1 with the difference that a series of inverted cones 41 and 42 are disposed in the tower, preferably equispaced, the cone 41 being spaced about one-third of the distance from the bottom of the tower and the cone 42 being spaced about two-thirds of the distance from the bottom. Each cone is joined securely at its periphery to the inner wall of the tower. An opening 43—44 is provided in the apex of each inverted cone, each opening being of the same, or approximately the same, diameter as the inlet opening 45 in the inverted cone 46 at the base of the tower.

In operation, gas is fed into the inlet opening 45 at the base of the tower and leach liquor and metal bearing material are charged as in tower 10. The mixture of slurry and gas rises through the first compartment towards the apex of inverted cone 41 and passes through the opening 43 at approximately the same rate as the feed materials are charged into the tower. The mixture of gas and slurry rises through compartment 48 to and through opening 44 in the apex of inverted cone 42, passing through the opening 44 into compartment 49. The mixture of gas and slurry rises through compartment 49 to the outlet conduit 50 through which the mixture is passed for subsequent treatment.

The high gas velocity through openings 43 and 44 prevents back flow of slurry from compartment 49 to compartment 48 and from compartment 48 to compartment 47. Thus, a staging effect is obtained and the rate of movement of gas and slurry through the tower can be closely regulated to obtain maximum extraction of metal values and maximum gas utilization. This modification of the invention has a further important advantage in that metal bearing material which has selective flotation characteristics tends to be trapped in the spaces below the peripheries of the inverted cones 41 and 42 where in it is exposed for a longer period to the reaction conditions.

The operation of the method of the present invention is illustrated by the following examples. Three towers were employed in series, as illustrated in Figure 2. Each tower formed a reaction column about ten inches in diameter and about thirty feet in height. Air at a pressure of from about 100 to about 125 pounds per square inch, and preferably about 105 pounds per square inch, was fed into the base of the first tower. This resulted in a pressure at the top of the first reaction column of about 95 pounds per square inch, and a pressure of about 80 pounds per square inch at the top of the third reaction column. Air provided the agitating medium and supplied the oxygen necessary for the leaching reaction. The air bubbles had an upward velocity of from about 30 to about 80 inches per second in the apex of the cone and from about four to eight inches per second in the full diameter of the reaction column. The reaction column, in operation was filled with an aqueous, strongly ammoniacal solution. Ammonia was added to the slurry in substantial execess of that required for reaction with the metal values to be extracted from the metal bearing material. Water was added to the slurry in amount sufficient to form a slurry which contained from about 14% to about 17% solids. The charge material was about 60% minus 200 mesh Standard Tyler Screen. The tower was filled from about 30% to about 60% and preferably from about 40% to 45% of its capacity with air bubbles.

*Example 1*

Copper sulphide concentrates which contained about 22.91% copper, 35.7% sulphur, 31.03% iron, and 1.22% insoluble matter were charged continuously into the base of the first reaction column at the rate of from about 24 to about 30 pounds per hour. Ammonia was charged continuously at the rate of from about 36 pounds to about 41 pounds per hour. Sufficient water was charged to produce a solution which contained from about 15% to about 18% solids. Air was fed into the base of the reaction column under a pressure of about 105 pounds per square inch at the rate of from about 55 to 57 standard cubic feet per minute. The temperature of each reaction column was maintained within the range of from about 160° F. to about 180° F. and preferably about 175° F. Movement of the slurry was regulated to provide a time of retention of about ten hours. It was found that from 81.4% to 95.5% of the copper and from 73.3% to 78.2% of the sulphur had been extracted from the starting material and dissolved in the solution. Iron values were converted to insoluble ferric hydrate and reported in the undissolved residue. Substantially no iron dissolved in the leach solution.

*Example I–A*

The conditions of Example I were repeated with the difference that the air flow was reduced to about 31.7 standard cubic feet per minute. The reduced air flow improved the extraction of copper and sulphur to from 93.5% to 95.3% and from 85.6% to 87.7% respectively with a time of retention of about ten hours.

This extraction of up to 95.5% of the copper and up to 87.7% of the sulphur values in 10 hours is about the same as the extraction obtained in a time of retention of about 16 hours when the mineral sulphides were leached in mechanically agitated autoclaves.

*Example II*

A copper sulphide concentrate which contained about 29.7% copper, about 1.25% nickel, about 30% sulphur and about 30% iron, was leached at about 175° F. with aqueous ammonia in amount sufficient to provide about 100 grams per litre free ammonia, sufficient water being added to form a pulp mixture which contained about 18% solids. Air was charged at the rate of about 120 standard cubic feet per square foot of cross section per minute at a pressure of about 105 pounds per square inch. With a time of retention of about ten hours, about 97% of the copper, 85% of the nickel and 92.6% of the total sulphur was extracted from the starting material and dissolved in the solution.

*Example II–A*

The conditions of Example II were repeated with the difference that the flow of air was reduced to about 74 standard cubic feet per square foot of cross section per minute. It was found that about 94.3% of the copper, 89% of the nickel and 94.5% of the sulphur were extracted from the starting material in about 12 hours and dissolved in the leach solution.

*Example III*

A nickel sulphide concentrate which contained about 11.8% nickel, 2% copper, 0.3% cobalt, 32% sulphur, and 31% iron was leached at about 175° F. with ammonia in amount sufficient to provide about 100 grams per litre free ammonia. Water was added in amount sufficient to produce a pulp mixture or slurry which contained about 18% solids. Air was charged into the first tower at the rate of about 68 standard cubic feet per square foot cross section per minute at a pressure of about 105 pounds per square inch. At the end of twenty hours leaching time about 94% of the nickel, 95.3% of the copper, about 74% of the cobalt, and about 88.1% of the sulphur had been extracted from the starting material and dissolved in the leach solution.

*Example III–A*

The conditions of Example III were repeated with the difference that the air flow was increased to about 76 standard cubic feet per square foot cross section per minute. The following recoveries were obtained in the indicated leaching periods.

| Time | Nickel, Percent Recovery | Copper, Percent Recovery | Cobalt, Percent Recovery | Sulphur, Percent Recovery |
|---|---|---|---|---|
| 4 hours | 86.5 | 90.8 | 52 | 46.1 |
| 8 hours | 93.1 | 91.5 | 58 | 59.7 |
| 16 hours | 96.3 | 96.0 | 64 | 67.9 |
| 20 hours | 97.1 | 97.3 | 72 | 79.2 |

*Example III–B*

The conditions of Example III were repeated with the difference that the air flow was increased to 84 standard cubic feet per square foot cross section per minute. The following recoveries were obtained in the indicated leaching period.

| Time | Nickel, Percent Recovery | Copper, Percent Recovery | Cobalt, Percent Recovery | Sulphur, Percent Recovery |
|---|---|---|---|---|
| 4 hours | 70.4 | 76.7 | 52 | 32.0 |
| 8 hours | 90.8 | 88.7 | 58 | 43.0 |
| 12 hours | 93.9 | 90.4 | 64 | 49.5 |
| 16 hours | 92.6 | 93.3 | 68 | 49.8 |
| 20 hours | 97.0 | 92.6 | 72 | 76.0 |

*Example III–C*

The conditions of Example III were repeated with the difference that the air flow was increased to 92 standard cubic feet per square foot cross section per minute. The following recoveries were obtained in the indicated leaching periods.

| Time | Nickel, Percent Recovery | Copper, Percent Recovery | Cobalt, Percent Recovery | Sulphur, Percent Recovery |
|---|---|---|---|---|
| 4 hours | 70.0 | 77.1 | 46.4 | 44.4 |
| 6 hours | 88.7 | 86.8 | 54.8 | 53.2 |
| 8 hours | 90.9 | 91.5 | 64.5 | 59.8 |
| 10 hours | 95.1 | 94.3 | 66.4 | 65.3 |
| 12 hours | 97.0 | 95.0 | 70.6 | 79.3 |

*Example III–D*

The conditions of Example III were repeated with the difference that the air flow was increased to 102 standard cubic feet per minute per square foot cross section per minute. The following recoveries were obtained in the indicated leaching periods.

| Time | Nickel, Percent Recovery | Copper, Percent Recovery | Cobalt, Percent Recovery | Sulphur, Percent Recovery |
|---|---|---|---|---|
| 4 hours | 84.1 | 83.6 | 54.6 | 40.0 |
| 6 hours | 91.7 | 87.8 | 61.2 | 47.0 |
| 8 hours | 97.6 | 93.3 | 69.8 | 52.7 |
| 10 hours | 91.2 | 82.7 | 70.2 | 53.1 |
| 12 hours | 94.6 | 93.6 | 71.0 | 69.3 |

It was found at the higher rate of air flow in this example that maximum extraction of nickel and copper values was obtained in about 8 hours. There was a tendency of dissolved nickel and copper values to hydrolyze and form insoluble compounds with ferric oxide particles as the leaching time was extended to increase the extraction of sulphur.

The method is, of course, very flexible and it can be modified readily for the treatment of different types of metal bearing material. For example, the method can be readily adapted to extract metal values from metal bearing material in a two stage operation in which fresh metal bearing material is mixed with leach solution containing dissolved metal values from a preceding leaching stage and charged into a reaction column of the type described above. The slurry withdrawn from this reaction column is filtered after separation of the gas. The filtrate, or clarified leach solution is treated for the separation and recovery of dissolved metal values. Filter cake is charged into a second reaction column wherein it is leached with fresh lixiviant for the extraction of residual metal values. The slurry from the second reaction column, after separation of the gas, is filtered. The filtrate containing dissolved metal values is passed to the first reaction column and the filter cake can be withdrawn from the circuit.

The method of the present invention possesses a number of very important advantages over conventional leaching methods conducted in mechanically agitated reaction vessels. The cost of towers or reaction columns compares favourably with the cost of conventional pressure vessels adapted to treat comparable volumes of slurry. Also, a substantial saving in capital cost is made in that it is not necessary to provide mechanical agitating devices. Also, difficulties in operation through failure and the cost of operating such mechanical agitating devices exposed to corrosive and abrasive slurries in closed reaction vessels at elevated temperatures and pressures and the design and maintenance of necessary bearings, stuffing boxes and seals which are ancillary to such devices are avoided. In addition, the leaching operation is conducted in much shorter periods and with much higher recoveries than are possible to obtain in conventional, mechanically agitated reaction vessels.

It will be understood, of course, that while the treatment of mineral sulphides with ammoniacal leach solution in the presence of an oxygen bearing, oxidizing gas has been employed to illustrate the operation of the method, the method can be employed on other types of metal bearing materials with other suitable acid, basic or neutral solvent or leach liquor for the metals to be extracted, and other suitable gases which contain constituents which take part in or are inert to the leaching reaction can be employed as agitating media.

What I claim as new and desire to protect by Letters Patent of the United States is:

1. The method of extracting selected metal values from metal bearing material and dissolving them in a leach liquor which comprises continuously feeding a slurry of finely divided solid metal bearing particles and a leach liquor for selected metal values contained therein and a stream of gas under pressure into the lower part of a vertically disposed reaction column, said column being maintained at a temperature and pressure above atmospheric temperature; forming in the reaction column a continuously rising turbulent suspension of gas bubbles, solid metal bearing particles and leach liquor of substantaily uniform cross section and of substantially uniform velocity without fall back of solid particles from the point of entry of the metal bearing particles to the point of discharge of the slurry; interregulating the distribution of metal bearing particles in the reaction column, the rate of discharge of undissolved solid particles and leach liquor and gas from the upper part of the reaction column and the extraction of metal values to obtain optimum extraction of metal values from the metal bearing particles in their upward passage through the reaction column by the rate of feeding slurry and gas into the lower part of the reaction column; and continuously discharging undissolved solid particles and leach liquor containing dissolved metal values and gas from the upper part of the reaction column.

2. The method of extracting metal values from metal bearing material according to claim 1 in which solid particles, gas and leach liquor containing dissolved metal values are continuously discharged from the upper part of the reaction column, and gas and undissolved solid particles are separated in the order named from the leach liquor.

3. The method of extracting metal values from metal bearing material according to claim 1 in which undissolved solids and leach liquor are continuously withdrawn from the reaction column at a point below the top thereof and gas is continuously withdrawn from the top of the column.

4. The method of extracting metal values from metal bearing material according to claim 1 in which a plurality of vertically disposed reaction columns is employed and including the steps of feeding a slurry of finely divided solid metal particles and leach liquor into the lower part of each reaction column, continuously discharging a slurry of undissolved solids and leach liquor containing dissolved metal values from the upper part of each reaction column, passing the slurry of solid metal particles and leach liquor and gas to the lower part of the next following reaction column in the series and continuously discharging undissolved solid particles, leach liquor containing dissolved metal values and gas from the final reaction column of the series.

5. The method extracting metal values from metal bearing material according to claim 1 in which the reaction column is divided into a series of vertically disposed compartments in communication with each other, each compartment being filled with a continuously rising turbulent suspension of gas bubbles, solid metal bearing particles and leach liquor of substantially uniform velocity without fall back of solid particles from the point of entry of metal bearing particles to each compartment to the point of discharge of slurry therefrom, a slurry of solid metal bearing particles, a leach liquor for selected metal values and gas under pressure is fed into the lower part of the reaction column, the suspension of gas bubbles, solid metal bearing particles and leach liquor rises upwardly through each compartment of the series, and undissolved solid particles, leach liquor containing dissolved metal values and gas are discharged from the uppermost compartment of the series.

References Cited in the file of this patent

UNITED STATES PATENTS

| | | |
|---|---|---|
| 682,232 | Beck | Sept. 10, 1901 |
| 737,533 | Naillen | Aug. 25, 1903 |
| 940,612 | Paterson | Nov. 16, 1909 |
| 1,426,099 | Prutzman | Aug. 15, 1922 |
| 1,783,591 | Stevens | Dec. 2, 1930 |
| 2,400,114 | Hills | May 14, 1946 |
| 2,576,314 | Forward | Nov. 27, 1951 |
| 2,616,781 | Forward | Nov. 4, 1952 |